US012600645B2

(12) United States Patent
Lenz

(10) Patent No.: US 12,600,645 B2
(45) Date of Patent: Apr. 14, 2026

(54) METHOD FOR RARE EARTHS EXTRACTION

(71) Applicant: Terry G Lenz, Fort Collins, CO (US)

(72) Inventor: Terry G Lenz, Fort Collins, CO (US)

( * ) Notice: Subject to any disclaimer, the term of this patent is extended or adjusted under 35 U.S.C. 154(b) by 247 days.

(21) Appl. No.: 18/542,655

(22) Filed: Dec. 16, 2023

(65) Prior Publication Data

US 2025/0197236 A1     Jun. 19, 2025

Related U.S. Application Data

(60) Provisional application No. 63/434,557, filed on Dec. 22, 2022.

(51) Int. Cl.
*C01F 17/229* (2020.01)
*C01F 17/10* (2020.01)
*C22B 1/24* (2006.01)

(52) U.S. Cl.
CPC ............ *C01F 17/229* (2020.01); *C01F 17/10* (2020.01); *C22B 1/24* (2013.01)

(58) Field of Classification Search
CPC .. C02F 1/488; C02F 1/48; C02F 1/484; C22B 3/22; C22B 1/24; C01F 17/10; C01F 17/229
See application file for complete search history.

(56) References Cited

FOREIGN PATENT DOCUMENTS

CN          108149033 A  *  6/2018  ............. C22B 7/007

* cited by examiner

*Primary Examiner* — Anthony J Zimmer
*Assistant Examiner* — Syed T Iqbal
(74) *Attorney, Agent, or Firm* — James A. Sheridan; Sheridan Law, LLC

(57)          ABSTRACT

A method for extracting a rare earth from a rare earth sample using magnetic-based concentration and separation of an ore containing a selected rare earth from a lanthanide series of elements. The method steps include selecting and grinding a rare earth sample into particle size from the lanthanide series of elements, treating the rare earth sample to variable weak electromagnets, treating the rare earth sample to a variable strong electromagnets and separating non-magnetic minerals. Then heating the rare earth sample in a thermal decomposition oven and then treating the rare earth sample to second variable strong electromagnets for a magnetic gradient ion exchange fixed bed separation. Finally, creating high grade rare earth oxides for further production of rare earth contained products.

16 Claims, 3 Drawing Sheets

Flow Diagram of Mineral Extraction Process
For Rare Earths

METHOD FOR RARE EARTHS EXTRACTION

The utility patent application is based on an earlier filed provisional patent application, Ser. No. 63/434,557, filed on Dec. 22, 2022, by the subject inventor and having a title of "Magnetic-Based Concentration and Separation of Ores Containing Rare Earth Elements

BACKGROUND OF THE INVENTION

(a) Field of the Invention

This invention relates to extracting rare earths from an ore and more particularly, but not by way of limitation, to a method using magnetic-based concentration and separation of an ore containing a selected rare earth from a lanthanide series of elements.

Approximately 5.5 million tons of heavy minerals are mined annually worldwide. The mined minerals serve as raw materials for an extraction of valuable elements, such as titanium, zirconium, thorium, and rare earths. These materials find widespread industrial uses for alloys, polishes, catalysts, ceramics, glass production, and foundries and refractory manufacturing. Currently, rare earths are used widely in electronic equipment, electric cars, wind turbines, cell phones, and similar uses.

Rare earth ores, such as bastnaesite and monazite, are found in low concentrations, in a range of 2 to 8%, in mixed rare earth elements, which include lanthanide series elements. These rare earth elements are similar chemically due to the their atomic electron configurations, for example, multiple unpaired 4f electrons and 3 identical 5d 6s2 valence electrons. The electron characteristics of the rare earth elements lead to separation difficulties, which involve processes that produce toxic waste from wet chemistry.

Therefore, the utilization of magnetic separation, taking advantage of paramagnetic and diamagnetic properties of the lanthanide series rare earth elements, is disclosed herein.

(b) Discussion of Prior Art

Currently, the only magnetic separation method step in rare earth processing is a removal of ferromagnetic (Fe, Ni, Co) materials from crushed ore. Also, the subject invention eliminates processing of rare earth elements using prior art methods that use wet chemistry, which produces substantial toxic waste.

SUMMARY OF THE INVENTION

In view of the foregoing, it is a primary objective of the subject invention to provide implementation of strong, permanent neodymium magnets or electromagnets, after the step of removing ferromagnetic material, for greatly improving the method of both concentrating the rare earth ore itself, and then separating the rare earth elements from each other.

Yet another object of the invention is the use of a bastnaesite crude ore to confirm rare earth materials are not only attracted to a magnetic field, but also are susceptible for separation from non-magnetic gangue material in the ore makeup.

Still another object of the invention is the method for rare earth extraction can also include processing monazite, xenotime, and other elements in the lanthanide series.

A further object of the invention is taking advantage of the magnetic susceptibility of the rare earths. Magnetic susceptibility of rare earths, for example La, Ce, Pr, Nd, and the like, have high paramagnetic values, with data confirming these values. In one example, bastnaesite ore is used to confirm that rare earth minerals are not only attracted to a magnetic field, but are also susceptible to separation from non-magnetic gangue material.

These and other objects of the present invention will become apparent to those familiar with processing of rare earth extraction from ore when reviewing the following detailed description, showing novel construction, combination, and elements as herein described, and more particularly defined by the claims, it being understood that changes in the embodiments to the disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of a method for rare earth separation in which.

DETAILED DESCRIPTION OF THE PREFERRED EMBODIMENTS

Figure 1:
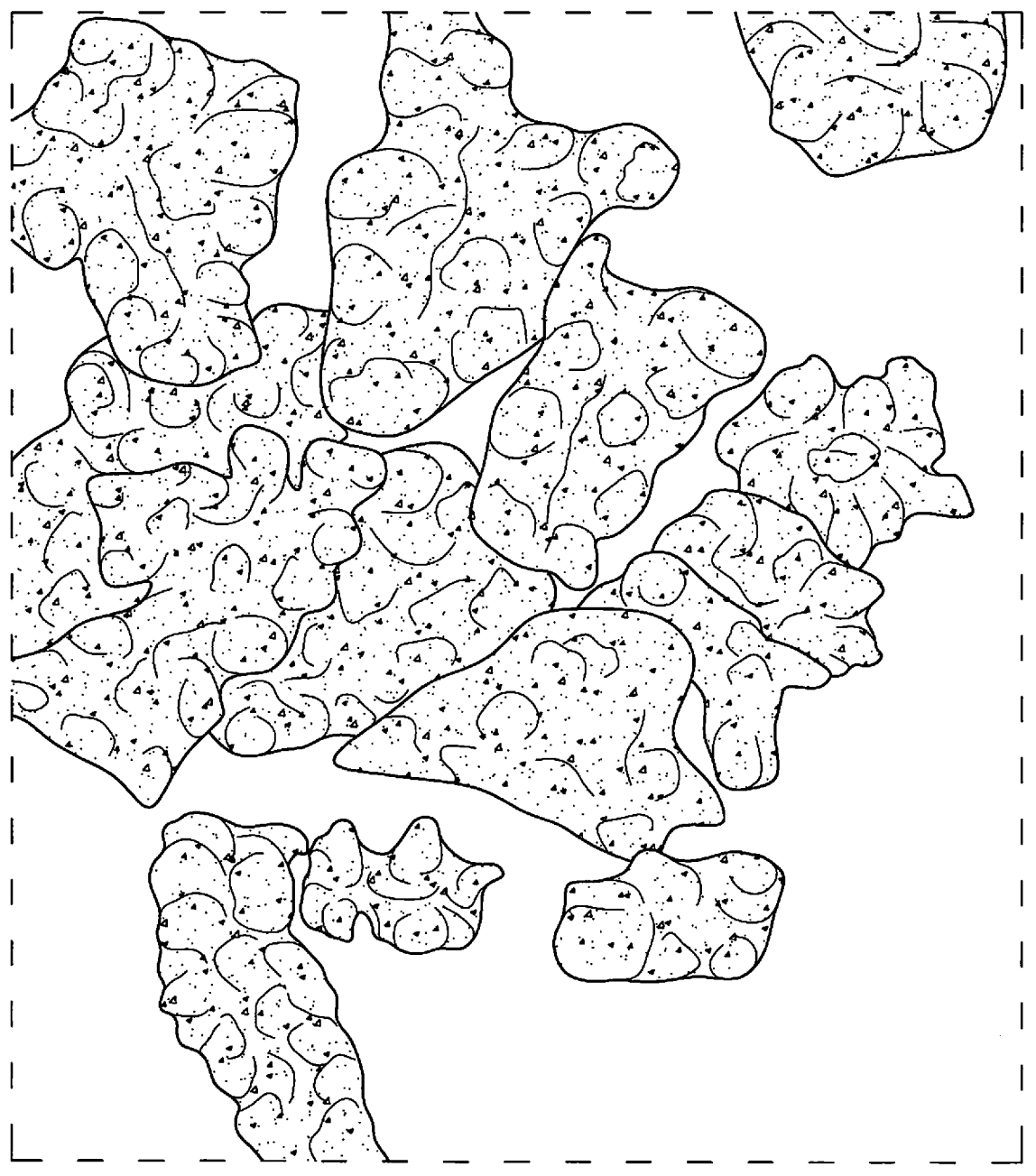
FIG. 1 is a microscopy picture of a crushed bastnaesite ore sample of rare earth.

In FIG. 1, a microscopy picture of a crushed bastnaesite ore sample of rare earth is shown. The picture uses scanning electron microscopy with an EDS map. Also, the microscopy uses an Oxford SDD detector with Aztec software for verifying particle size and presence of rare earth elements.

Figure 2:
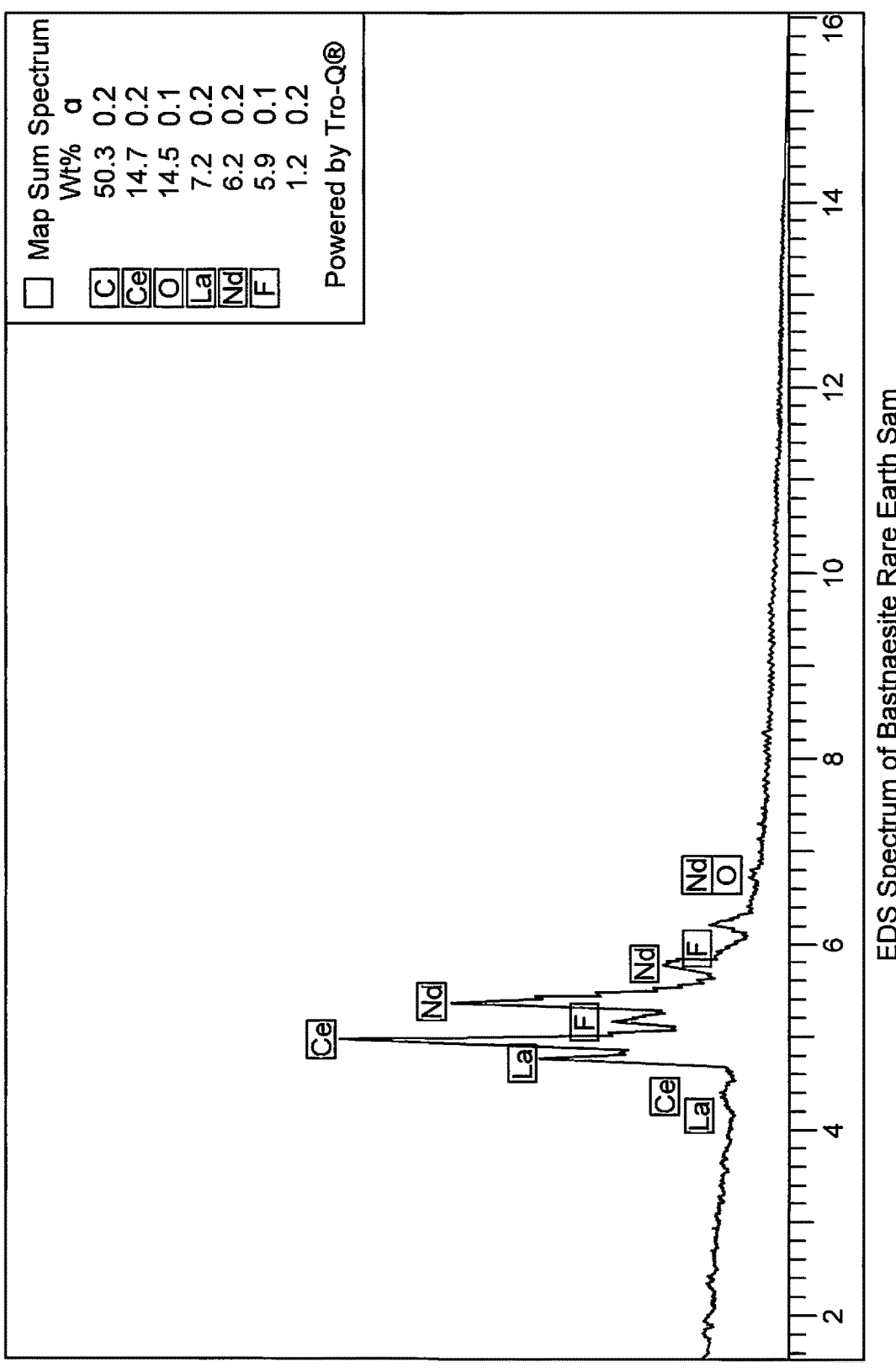
FIG. 2 is an EDS spectrum of the rare earth sample shown in FIG. 1.

In FIG. 2, an EDS spectrum of the rare earth sample is shown as in FIG. 1. The spectrum illustrates an approximate elemental weight percentages of the make up of bastnaesite ore sample.

Figure 3:
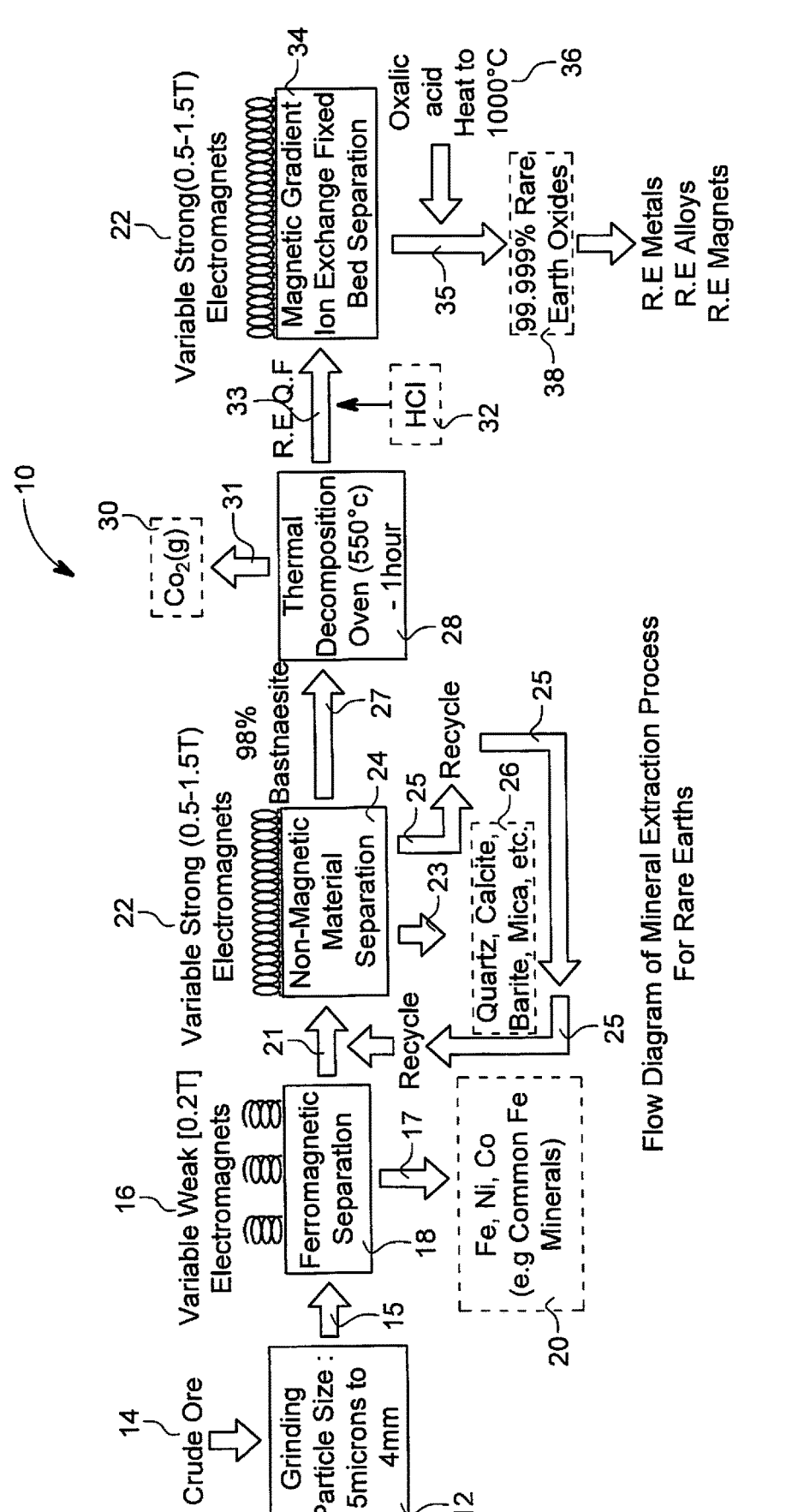
FIG. 3 is flow diagram for processing rare earth ore using variable strength electromagnetics.

In FIG. 3, a flow diagram for processing rare earth ore using variable strength electromagnetics is illustrated. The diagram has a general reference numeral 10. The first method step is to grind 12 a rare earth sample 14. The sample can be bastnaesite, monazite, and like lanthanide series elements. The grinding 12 of the rare earth sample 14 is typically in a range of 5 microns to 4 mm. The bastnaesite consists of, for example, 8% bastnasite and 92% gangue mixture. The gangue mixture consists primarily of orthoclase, with ferro-rutile.

The rare earth sample 14 is then conveyed, as indicated by arrow 15, under variable weak, less than (0.20 T) electromagnets 16. The electromagnets 16 have a surface field strength in a range of 0.05 to 0.15 Tesla (T) and less than 0.20 Tesla (T) for removing the ferromagnetic material. At this time, ferromagnetic separation 18 occurs and common Fe, Ni, Co, and common minerals 20 are separated, as indicated by arrow 17, from the rare earth sample 14.

From the variable weak electromagnets 16, the rare earth sample 14 is then conveyed, as indicated by arrow 21, under variable strong, in a range of (0.5 to 2.5 T) electromagnets 22. A non-magnetic material separation 24, as indicated by arrow 23, now occurs and Quartz, Calcite, Barite, Mica and like minerals 26 are removed from the extraction process. Note, arrows 25 illustrate this method step for the non-magnetic material separation 24 can be repeated for additional removal of trace material in the bastnaesite.

After the step of non-magnetic separation, it has been found 90% of the bastnaesite has been recovered from the original rare earth sample 14. This feature confirms that magnetic field forces (permanent or electromagnetic) can concentrate rare earth bastnaesite in a solid form for further processing. Also, this concentration step eliminates multiple complex wet chemistry steps (flotation, leaching, liquid/liquid extraction) currently used in rare earth extraction processes.

The recovered bastnaesite is now analyzed using a scanning electron microscopy (SEM) and an energy-dispersive X-ray spectroscopy (EDS) to determine the rare earth concentrations from a mapped area. The SEM analysis provides particle size of the ore, as shown in FIG. 1. The EDS provides approximate elemental cerium, lanthanum, neodymium, and praseodymium concentrations, as shown in FIG. 2.

The 90% bastnaesite is now conveyed, as indicated by arrow 27, to a thermal decomposition oven 28, where it is heated in a range of 500 to 1000 degrees centigrade and more specifically to 550 degrees centigrade from 1 to 5 hours. The oven can be a zirconia crucible or similar type of crucible. By heating the bastnaesite, rare earth flurocarbonates are converted to rare earth oxyfluorides. Additional loss of weight data of the sample and EDS analysis verify $CO_2(g)$ 30, has been driven off, as indicated by arrow 31, during the oven heating step, thus producing the rare earth oxyfluorides.

As an added method step, as indicated by arrow 33, the oven-heated, rare earth oxyflourides are dissolved in 2-3 molar (M) hydrochloric acid 32. The mixing with the hydrochloric acid 32 provides an aqueous rare earth halide solution. The solution is then fed to a conventional fixed bed ion exchange unit 34 for producing individual high purity rare earth oxides. The addition of a variable magnetic field (0.5-1.5 T) prior to and during the fixed bed ion exchange assists in shortening the time for separation and lower cost for chemicals during the ion exchange method step.

From the separation unit 34, as indicated by arrow 35, the rare earth neutralized chlorides are removed and treated with oxalic acid 36 and heated, in a range of 900 to 1100 centigrade and more specifically to 1000 centigrade. Thus 99.999% rare earth oxides are produced using the above described method for rare earth extraction. The rare earths produced can be metals, alloys and magnets.

The overall rare earth process described above embodies other potential benefits, such as magnetomigration of the rare earth ions in solution. In particular, the magnetic gradient ion exchange fixed bed separation 34, shown in FIG. 3, will separate specific rare earth elements from each other due to their different magnetic susceptibilities.

It should be noted, to further test and provide proof of concept of the subject magnetic-based process for ore concentration and separation of rare earth elements, a 34 gram hard rock rare earth sample 14 of bastnaesite ore was obtained from a rare earth mine at Mountain Pass, California. Half of the ore sample was run through the process, described in FIG. 3. A mixed rare earth oxide product was recovered, which contained 90% of the maximum rare earth oxide possible in the rare earth sample 14.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The invention claimed is:

1. A method for extracting a rare earth from a rare earth sample using magnetic-based concentration and separation of an ore containing a selected rare earth from a lanthanide series of elements, the steps comprising:
   selecting and grinding a rare earth sample into particle size from the lanthanide series of elements;
   treating the rare earth sample to variable weak electromagnets and separating ferromagnetic minerals from the rare earth sample
   treating the rare earth sample to a variable strong electromagnets and separating non-magnetic minerals from the rare earth sample;
   heating the rare earth sample in a thermal decomposition oven;
   treating the rare earth sample to second variable strong electromagnets for a magnetic gradient ion exchange fixed bed separation; and
   creating rare earth oxides for further production of rare earth contained products.

2. The method as described in claim 1 wherein the particle size in a range of 5 microns to 4 mm.

3. The method as described in claim 1 wherein the variable weak electromagnets have a field strength of less than 0.20 T.

4. The method as described in claim 1 wherein the variable strong electromagnets have a field strength of 0.5-2.5 T.

5. The method as described in claim 1 wherein heating the rare earth sample in the thermal decomposition oven removes $CO_2$ gas from the rare earth sample.

6. The method as described in claim 1 wherein the rare earth sample is heated in a range of 500 to 600 degrees centigrade.

7. The method as described in claim 1 wherein treating the rare earth sample to a variable strong electromagnets and the step of separating non-magnetic minerals from the rare earth sample includes recycling the rare earth sample past the variable strong electromagnets for removing trace element of the non-magnetic minerals.

8. A method for extracting a rare earth from a rare earth sample using magnetic based concentration and separation of an ore containing a selected rare earth from a lanthanide series of elements, the steps comprising:
   selecting and grinding a rare earth sample into particle size form the lanthanide series of elements;
   treating the rare earth sample to variable weak electromagnets and separating ferromagnetic minerals, such as Fe Ni, Co, and like common Fe minerals from the rare earth sample;
   treating the rare earth sample to a variable strong electromagnets, and separating non-magnetic minerals from the rare earth sample
   heating the rare earth sample in a thermal decomposition oven;
   treating the rare earth sample to a second variable strong electromagnets as to magnetic gradient ion exchange fixed bed separation; and
   creating rare earth oxides for further production of rare earth contained products.

9. The method as described in claim 8 wherein the variable weak electromagnets have a field strength of less than 0.20 T.

10. The method as described in claim 8 wherein the variable strong electromagnets have a field strength of 0.5-2.5 T.

11. The method as described in claim 8 wherein treating the rare earth sample to variable strong electromagnets and the step of separating non-magnetic minerals from the rare earth sample includes recycling the rare earth sample past the variable strong electromagnets for removing trace element of the non-magnetic minerals.

12. The method as described in claim 8 wherein heating the rare earth sample in the thermal decomposition oven removed $CO_2$ gas from the rare earth sample.

13. The method as described in claim 8 wherein the rare earth sample is heated in the thermal decomposition oven.

14. A method for extracting a rare earth from a rare earth sample using magnetic-based concentration and separation of an ore containing a selected rare earth from a lanthanide series of elements, the steps comprising:

selecting and grinding a rare earth sample into particle size from the lanthanide series of elements;

treating the rare earth sample to variable weakness electromagnets having a field strength of less than 0.20 T; and separating ferromagnetic minerals, such as Fe, Ni, Co, and like common Fe minerals from the rare earth sample;

treating the rare earth sample to a variable strong electromagnet having a field strength of 0.5-2.5 T, and separating non-magnetic minerals from the rare earth sample;

heating the rare earth sample in a thermal decomposition oven;

treating the rare earth sample to second variable strong electromagnets for a magnetic gradient ion exchange fixed bed separation; and creating rare earth oxides for further production of rare earth contained products.

15. The method as described in claim 14 wherein treating the rare earth sample to variable strong electromagnets and the step of separating non-magnetic minerals from the rare earth sample includes recycling the rare earth sample past the variable strong electromagnets for removing trace element of the non-magnetic minerals.

16. The method as described in claim 14 wherein heating the rare earth sample in the thermal decomposition oven removes $CO_2$ gas from the rare earth sample.

* * * * *